United States Patent
Parlow et al.

(10) Patent No.: US 8,671,682 B2
(45) Date of Patent: Mar. 18, 2014

(54) MULTI-STAGE TURBOCHARGING SYSTEM UTILIZING VTG TURBINE STAGE(S)

(75) Inventors: Eric Parlow, Etowah, NC (US); Patrick Sweetland, Arden, NC (US); Matt Rice, Hendersonville, NC (US)

(73) Assignee: BorgWarner Inc, Auburn Hills, MI (US)

(*) Notice: Subject to any disclaimer, the term of this patent is extended or adjusted under 35 U.S.C. 154(b) by 0 days.

(21) Appl. No.: 12/582,150

(22) Filed: Oct. 20, 2009

(65) Prior Publication Data

US 2010/0083656 A1  Apr. 8, 2010

Related U.S. Application Data

(63) Continuation of application No. 11/235,846, filed on Sep. 27, 2005, now abandoned.

(60) Provisional application No. 60/613,615, filed on Sep. 27, 2004.

(51) Int. Cl.
F02B 33/44 (2006.01)
F02B 33/00 (2006.01)
F02B 37/00 (2006.01)
F02B 37/013 (2006.01)
F02M 25/07 (2006.01)

(52) U.S. Cl.
USPC .............. 60/612; 60/602; 60/605.1; 60/605.2

(58) Field of Classification Search
USPC ............... 60/612, 602, 605.1, 605.2; 123/562
IPC .................................................. F02B 037/013
See application file for complete search history.

(56) References Cited

U.S. PATENT DOCUMENTS

| 4,852,353 | A | * | 8/1989 | Holmer | 60/612 |
| 4,930,315 | A | * | 6/1990 | Kanesaka | 60/612 |
| 5,063,744 | A | * | 11/1991 | Ishiyama et al. | 60/612 |
| 6,311,493 | B1 | * | 11/2001 | Kurihara et al. | 60/612 |
| 6,655,141 | B1 | * | 12/2003 | Faletti | 60/602 |

(Continued)

FOREIGN PATENT DOCUMENTS

| DE | 19961610 A1 | * | 4/2001 | F02B 37/013 |
| DE | 10015291 A1 | * | 10/2001 | F02B 37/013 |

(Continued)

*Primary Examiner* — Thai Ba Trieu
(74) *Attorney, Agent, or Firm* — Miller Canfield (57) ABSTRACT

Multi-stage turbocharging, and more particularly, an advanced multi-stage turbocharging system using the variable turbine power of one or more variable turbine geometry (VTG) turbochargers to adjust compressor boost and exhaust back pressure to engine operating demands. The invention further relates to a turbocharged internal combustion engine, in particular a turbocharged internal combustion engine with at least one high-pressure turbine stage and one downstream low-pressure turbine stage, wherein the high-pressure turbine may be a single-flow or double-flow type, wherein the high pressure or low pressure compressor may be variable geometry, wherein the high pressure or low pressure compressor may be variably bypassed, and wherein the high pressure or low pressure turbine may be provided with an active control variable bypass or wastegate.

5 Claims, 5 Drawing Sheets

(56) References Cited

U.S. PATENT DOCUMENTS

| | | | |
|---|---|---|---|
| 6,694,736 B2 * | 2/2004 | Pfluger | 60/612 |
| 6,973,787 B2 * | 12/2005 | Klingel | 60/612 |
| 6,981,375 B2 * | 1/2006 | Sisken et al. | 60/612 |
| 7,165,540 B2 * | 1/2007 | Brookshire et al. | 60/605.2 |
| 7,174,777 B2 * | 2/2007 | Fischer et al. | 73/118.1 |
| 8,302,400 B2 * | 11/2012 | Auffret et al. | 60/605.2 |
| 8,479,512 B2 * | 7/2013 | Auffret et al. | 60/605.2 |
| 2003/0074899 A1 * | 4/2003 | Yamaguchi et al. | 60/612 |
| 2006/0042246 A1 * | 3/2006 | Gray et al. | 60/612 |
| 2006/0042247 A1 * | 3/2006 | Haugen | 60/612 |
| 2006/0059910 A1 * | 3/2006 | Spaeder et al. | 60/612 |
| 2006/0123782 A1 * | 6/2006 | Rosin et al. | 60/612 |
| 2010/0064685 A1 * | 3/2010 | Auffret et al. | 60/605.2 |

FOREIGN PATENT DOCUMENTS

| | | | | |
|---|---|---|---|---|
| DE | 10144663 A1 | * | 4/2003 | F02B 37/013 |
| DE | 10352712 A1 | * | 6/2005 | F02B 37/013 |
| DE | 102005025885 A1 | * | 12/2006 | F02B 37/013 |
| EP | 1275832 A2 | * | 1/2003 | F02B 37/013 |
| EP | 1387058 A2 | * | 2/2004 | F02B 37/013 |
| EP | 1519017 A1 | * | 3/2005 | F02B 37/013 |
| EP | 1728989 A1 | * | 12/2006 | F02B 37/013 |
| JP | 2005146906 A | * | 6/2005 | F02B 37/013 |
| JP | 2005315163 A | * | 11/2005 | F02B 37/013 |
| JP | 2006057570 A | * | 3/2006 | F02B 37/013 |
| JP | 2006183605 A | * | 7/2006 | F02B 37/013 |
| WO | WO 2004097195 A1 | * | 11/2004 | F02B 37/013 |
| WO | WO 2006050746 A1 | * | 5/2006 | F02B 37/013 |

* cited by examiner

AMENDED FIGURE 10:

Fig. 10

MULTI-STAGE TURBOCHARGING SYSTEM UTILIZING VTG TURBINE STAGE(S)

FIELD OF THE INVENTION

The invention relates to advanced multi-stage turbochargers using at least one variable turbine geometry (VTG) turbocharger stage to enable higher pressure ratios, better torque at low engine speed, increased power/altitude capability at high speeds, a wider operating range without running into choke or surge, improved flexibility, and improved transient capability. The invention further relates to a turbocharged internal combustion engine with at least one high-pressure turbine stage and one downstream low-pressure turbine stage, wherein the high-pressure turbine may be a single-flow or double-flow type, wherein the high pressure or low pressure turbine or compressor may be bypassed, wherein the high pressure or low pressure turbine or compressor may be variable geometry, and wherein the low pressure turbine may be provided with an adjustable bypass or wastegate.

DISCUSSION OF THE RELATED ART

Commercial vehicle engines are the 'marathon runners' among internal combustion engines. They need to develop tremendous torque to allow the vehicle to pull away on a hill, while at the same time having to provide sufficient power even at low engine speeds in order to maximize fuel economy when driving on highways or motorways. Power output, fuel consumption and emission control in particular will make extreme demands on the turbo-charger technology of the future, as the stricter Euro 4 emission standard also comes into force for 2006 commercial vehicles.

Fixed geometry turbochargers can be designed to operate efficiently at a particular engine load and speed. However, when operated over a broad range of engine speed and load, the compressor and turbine components are forced to function off their design points and consequently suffer losses in efficiency that adversely affects engine performance. If the turbocharger is matched to an engine at the engine's rated speed, it will run considerably off its maximum efficiency where the engine is "torqued down" to low engine operating speeds. Conversely, if the turbocharger is matched to an engine's low speed range, the turbocharger will have a tendency to "overspeed" when the engine is operated at maximum speed and load.

To prevent overspeeding in turbochargers that have been matched to the low engine speed range, a waste gate is frequently used to bypass exhaust gas around the turbine to limit turbine speed over the high engine speed range. The waste gate, however, allows the escape of exhaust gas energy which could be better utilized by the turbocharger turbine, and results in a substantial loss in system efficiency.

One way to overcome this problem is to use a variable device in the engine exhaust system as disclosed in U.S. Pat. No. 3,557,549 (Webster). This system employs a flapper valve so positioned in a divided manifold system that it resides in a neutral position at high engine speed and load, but can be moved to a second position where it diverts all engine exhaust gas flow into one passage of a divided turbine casing at low engine speeds. This essentially doubles the flow of exhaust gas through the single turbine casing passage and maintains the turbocharger speed at higher levels than otherwise could be reached at low engine speeds. This device is much simpler than the complicated variable nozzle vane systems and does not require a precise control system for positioning. However, the increase in boost at low engine speeds produced by the diverted flapper valve might be great enough to cause the turbocharger compressor to operate in its surge or unstable area. In this case, the compressor must be rematched to move its surge line to lower air flow so that the engine operating points fall within its stable operating regime. This in turn causes a movement of the compressor efficiency islands and choke area to lower flow and can result in lowering the compressor efficiency when the engine is operating at high speed and load.

A more efficient system is one comprising variable geometry components in the turbocharger compressor, the turbocharger turbine, or both. The most common types position variable nozzle vanes ahead of the turbine wheel and/or variable diffuser vanes in the compressor diffuser component. Variable nozzle vanes ahead of the turbine wheel are connected together so that the throat area of each nozzle passage can be reduced over the low engine speed range and increased as the engine speed approaches its maximum, so that the turbocharger speed is kept within a safe operating range. The positioning of the vanes must be precisely controlled by engine speed and load, and they must be freely movable in the hot exhaust gas environment with minimal leakage through clearance spaces.

Using a variable geometry compressor to shift the performance map of the compressor to a lower or higher flow range is one solution to the problem of keeping the compressor out of surge at low engine speeds and still maintain high efficiency at high engine speeds. Variable diffuser vanes is one type of variable geometry compressor that could be employed, but the movable vanes cause significant mechanical complication internally in the construction of the turbocharger and must be precisely positioned by a rather elaborate control system.

Now that the single stage exhaust turbochargers with variable turbine geometry (VTG) have become the state of the art in diesel engines for passenger cars and to some extent for commercial vehicle applications, the limits of single-stage turbocharging have almost been reached. A further increase in the rated power usually leads to a reduced starting torque. The developers of new turbocharging systems are therefore faced with a dilemma: achieving a further rise in the rated power of an engine would require the use of a relatively large turbocharger. However, in order to ensure that a high boost pressure is rapidly generated even at low engine speeds, the turbine and compressor would have to be made much smaller.

A different approach is illustrated in U.S. Pat. No. 3,941,104 (Egli) entitled "Multiple turbocharger apparatus and system". Egli teaches that in the field of supercharging internal combustion engines it is known to have two series coupled turbochargers. In the case that where there are no controls, it is known that as the through-flow of exhaust gas drops off with a decrease of engine speed and/or load, the high-pressure turbine dominates the energy extraction and thus the low-pressure turbine produces little power. Egli solves the problem of low power production in the low-pressure turbine by providing the low-pressure turbocharger with a gas distributor of the single-passage type, within which passage is mounted a single movable vane arranged to control the exhaust gas flow to the turbine rotor. While being simple, this two-stage turbocharger system does not produce the combination of performance and emissions characteristics required of modern propulsion systems.

The next major improvement in two stage turbochargers appeared to be the regulated 2-stage (R2S) turbocharging system, in which two differently sized turbochargers were arranged in series: a small high-pressure turbocharger and a large low-pressure turbocharger. Regulated two stage turbocharger systems are characterized by waste-gate or bypass means to allow bypass of either the HP turbine, the HP compressor, or both In early two-stage turbocharging systems, at low speed exhaust initially flowed through the high-pressure turbine. As the rotational speed of the internal combustion engine increased, mass flow then gradually transitioned to the low pressure low-pressure turbine, and ultimately a changeover was made to single-stage compression exclusively in the low-pressure compressor, completely bypassing the high-pressure turbine. In the event of frequent load and speed changes of the internal combustion engine, a changeover must frequently be made between one-stage and two-stage mode of operation of the turbocharging unit. Consequently, there may be a loss of traveling comfort, i.e. unsteady acceleration and braking power response.

The solution to this problem, according to U.S. Pat. Nos. 6,378,308 and 6,694,736 (Pflueger), is to have the high-pressure turbine always flowed through by a minimum exhaust mass flow so that it continuously has at least a minimum RPM. Because there is a continuously flow through the high-pressure (HP) turbine at least to a certain extent, and this flow circulates, it is ensured that in the case of acceleration a minimum turbocharging pressure exists and, in particular, the rotational speed of the HP rotor is at a favorable initial state. According to one aspect of the invention, with low load of the engine the expansion work is shifted to the low-pressure (LP) turbine and with high load of the engine the expansion work is at least initially shifted to the HP turbine. That is, if the engine is operating at low engine speeds/loads, i.e. low exhaust gas mass flows, and a rapid burst of power is suddenly needed, the HP bypass is closed and the entire exhaust gas flow expands through the HP turbine. This results in a very quick and high boost pressure rise, without "turbo lag". Then, after the need for rapid boost has passed—e.g., the vehicle has reached the desired speed—the HP bypass valve is again opened, progressively shifting more of the expansion work back to the LP turbine (which, due to it's larger size, can handle higher air mass flow).

The R2S turbocharging system, first introduced in the passenger car arena, is now also conquering the commercial vehicle market, and allows an infinitely variable adaptation of the turbine and compressor side to any engine operating point. However, the stricter Euro 4 emission standards require even further benefits in economy and emissions.

BorgWarner Inc. U.S. Pat. Nos. 6,378,308 and 6,694,736 (Pflueger) show, in FIG. 5, a further breakthrough, namely, a variable two stage (V2S) system in which the high pressure turbine is a VTG turbine. In contrast to regulated two stage turbocharger systems which are characterized by waste-gate or bypass means to allow bypass of either the HP turbine, the HP compressor, or both, the V2S system is characterized by an absence of wastegate valves and bypass piping. Instead, exhaust gas from the engine is channeled though a manifold to a turbine equipped with variable control vanes. The VTG, when open, will have a large flow characteristic and therefore will not necessitate use of a bypass to increase the swallowing capacity. When the VTG is closed, it will have a small flow characteristic, thereby providing the best transient and low speed boost capability. The throttling losses from the turbine bypasses are thereby avoided.

The V2S is further advantageous in that it only requires the use of one actuator (for the VTG), as opposed to multiple (expensive) actuators characteristically used in R2S. V2S is also able, using variable turbine power via VTG, to adjust compressor boost and exhaust back pressure to engine operating demands. An intercooler may be provided between the low-pressure and high-pressure compressors, or an aftercooler may be provided between the high-pressure compressor and the engine intake, for greater thermodynamic efficiency.

Yet a further refinement in the two stage turbocharging art is shown in Pflueger FIG. 6, showing a variable geometry regulated two stage (VR2S), differing from the V2S system by the further provision of a bypass line for bypassing the HP VTG and a valve for controlling exhaust gas flow, thus combining the advantages of V2S and R2S. During cruising or slow speed operation, the high pressure turbine can substantially be bypassed. The high pressure turbine is however not choked off—it is allowed to spin freely and, since it remains coupled to the high pressure compressor, spins at the same rate as the high pressure compressor. Since the high pressure compressor is already part way up to operating speed, there is little "turbo lag" when there is a need for immediate boost.

Pflueger FIG. 7 shows two interesting features—a double flow (twin volute) HP turbine and bypass lines provided for the HP turbine, the LP turbine, and the HP compressor. This embodiment is described as having proven itself to be particularly useful with passenger car engines in view of significant benefits in motor efficiency, fuel consumption, and emissions in the upper speed range. Apparently the small HP turbine serves as an exhaust gas restrictor, raising the exhaust manifold pressure and providing sufficient pressure differential to support exhaust gas recirculation (EGR). This allows return of exhaust gas back into the intake air upstream of the HP compressor to suppress formation of NOx.

Despite the advances represented by the above systems, the stricter emissions mandates are driving engineers to seek even greater benefits in turbocharger systems.

Accordingly, there is a need for engine systems able to meet stringent NOx and particulate requirements according to future emissions legislation. There is a need for a turbocharger system with exhaust back pressure control for driving high or intermediate pressure EGR. There is also a need for improved overall fuel economy. Operating at high air flow ratios is desirable to meet reduced particulate requirements On the other hand, the consumer does not want to sacrifice power or performance.

There is thus need for an uncomplicated system able to improve low engine RPM boost/torque, particularly in medium size trucks. There is also a need to improve transient response.

There would be advantage to providing high pressure ratio >3, and it would be desirable to do this with "standard" off-the-shelf compressors.

The invention thus further concerns providing an economical internal combustion engine which responds to fast load and speed changes without unsteady acceleration and braking power response. The turbocharging pressure is intended, in the case of acceleration—i.e. when the vehicle is to be accelerated—to build up rapidly and be capable of being adapted infinitely and variably to the engine requirements.

SUMMARY OF THE INVENTION

Following extensive theoretical discussions, followed by laboratory prototyping and road testing of various turbocharger systems, the present inventors discovered that, among the hundreds of possible modifications and combinations that may be made to multi-stage turbocharger systems, a few certain specific modifications or adjustments resulted in improved fuel economy and reduced emissions while at the same time improving engine responsiveness.

For conciseness, in the following discussion the term "regulated" or the letter "R" shall refer to embodiments wherein the HP turbine is provided with a bypass, the term "variable" or the letter "V" shall generally refer to embodiments wherein the HP turbine is a VTG, "compressor bypass" or "CB" shall refer to embodiments wherein the HP compressor is provided with a bypass, and the letter "L" shall refer to the low pressure compressor or turbine.

According to a first embodiment of the invention, the inventors discovered that significant benefits could be obtained by providing a variable regulated two stage turbocharger (VR2S) with a HP compressor bypass (hereafter VR2S-CB).

According to a second embodiment of the invention, the inventors discovered that significant benefits could be obtained by providing a variable regulated stage turbocharger VR2S with a LP VTG turbine (hereafter "dual variable two stage" or DV2S).

According to a third embodiment of the invention, the inventors discovered that significant benefits could be obtained by providing a VR2S with a HP compressor bypass and with a LP turbine bypass (hereafter VR2S-CB-LTB).

According to a fourth embodiment of the invention, the inventors discovered that significant benefits could be obtained by providing a V2S with a LP turbine bypass (hereafter V2S-LTB).

According to a fifth embodiment of the invention, the inventors discovered that significant benefits could be obtained by providing a DV2S with a HP turbine bypass (thus making the system "regulated") and with a LP turbine bypass (hereafter DVR2S-LTB).

According to a sixth embodiment of the invention, the inventors discovered that significant benefits could be obtained by providing a DVR2S with a HP compressor bypass and with a LP turbine bypass (hereafter DVR2S-CB-LTB).

According to a seventh embodiment of the invention, the inventors discovered that benefits could be obtained by providing a R2S with a HP turbine bypass (thus making the system "regulated") and with a variable geometry LP turbine, with an EGR line optionally providing exhaust gas between the LP and HP compressors.

According to an eighth embodiment of the invention, the inventors discovered that significant benefits could be obtained by providing a two stage turbocharger with a twin-volute HP turbine, wherein each of the volutes is provided with a bypass, and with a variable geometry low pressure turbine, the LP turbine optionally provided with bypass, and the HP compressor and LP compressor optionally independently provided with bypass.

BRIEF DESCRIPTION OF THE DRAWINGS

Preferred embodiments of the invention are explained in the following sections with reference to the following drawings showing.

DETAILED DESCRIPTION OF THE INVENTION

Multi-stage turbocharging has been utilized for many years. It has enabled higher pressure ratios and wider flow range from a boosting system. It is typically desirable in multi-stage applications that the first, or high pressure, stage be made as small as possible. This provides improved transient capability and, when combined in series with a relatively large second, or low pressure, stage results in a wider flow range. The wide flow range allows the engine torque at low engine speeds to be increased and the rated power/altitude capability at high speeds to be increased without running into compressor surge or choke. The amount to which the high pressure stage can be reduced in size is limited by the need to overlap its flow range with the low pressure stage. In addition the high-pressure stage can become limited in its ability to swallow all the flow at high engine speeds and loads. The low-pressure stage is sized by the rated power and altitude requirements of the engine.

The normal method used to reduce the high-pressure stage size is to provide parallel turbine and/or parallel compressor bypasses for the high-pressure stage. This prevents the high-pressure stage from choking the flow and allows the size of the high-pressure stage to be reduced. The amount of size reduction is still limited by the amount of flow overlap required between the two units. However, the two high-pressure stage bypasses do remove the high pressure sizing restriction that is caused by flow restriction and overspeed considerations. A low pressure stage turbine bypass can also be added to allow the low pressure stage to be further reduced in size, hence also allowing the high pressure size to be further reduced while still providing the required amount of flow overlap in the two stages.

The use of both the high and low-pressure stage bypasses so far mentioned involves the addition of flow losses and complexity. The flow losses from the turbine bypasses results in throttling of the flow and the loss of available energy. This is identical to the losses that occur within standard wastegated turbochargers and leads to a direct loss of efficiency for the engine. The compressor bypass involves flow losses that will reduce the effectiveness of the compressor stage.

As an alternative to the use of bypasses as found in a regulated two stage system, in accordance with the invention VTG turbine(s) are used in a multi-stage turbocharging system. The VTG, when open, will have a large flow characteristic and therefore will not require the use of a bypass to increase the swallowing capacity. When the VTG is closed, it will have a small flow characteristic, thereby providing the best transient and low speed boost capability. The throttling losses from the turbine bypasses are thereby avoided.

Each VTG only requires the use of one actuator, as opposed to the 3 actuators required to bypass both turbines and the high-pressure compressor in the case of a conventional R2S system. The VTG stage(s) can also be used with the aforementioned bypasses for even wider operating range and flexibility.

Dual VTGs (DV2S, DVR2S) an be used to offer even more enhanced operation.

Since, even in the case that the HP turbine is bypassed (bypass is fully open), the HP turbine is not blocked from exhaust gas flow, and there remains a continuous flow through the HP turbine at least to a certain extent, and this flow circulates, it is ensured that in the case that rapid acceleration—without turbo-lag—is required, a minimum turbocharging pressure exists and, in particular, the rotational speed of the HP rotor is at a favorable initial level. Furthermore, the individual exhaust mass flows can be supplied to the high-pressure turbine, the low-pressure turbine, or the fresh air side by the arrangements according to the invention with the help of the central processing unit and the pipe switch to the extent desired in each case, so that an optimization of the mode of operation of the engine can be made with respect to minimum fuel consumption and/or minimum pollutant emission.

With corresponding load and increasing rotational speed of the engine, a fast response of the high-pressure turbine is thus ensured in that the expansion work is shifted in the direction of the high-pressure turbine, i.e. through extensive closure of the bypass channel by means of a pipe switch, the largest portion of the exhaust flow is fed to the high-pressure turbine. If, at low load and with small exhaust mass flows, a low-consumption, small load and, above all, exhaust counter pressures are desired in this operating range, the expansion work of the exhaust can for the greater part take place in the low-pressure turbine and possibly by appropriate positioning of the pipe switch via the exhaust return, independently of the rotational speed of the engine, by opening the bypass channel.

In the following, the exemplary embodiments of the invention will be discussed in greater detail with reference to the figures.

Figure 1:
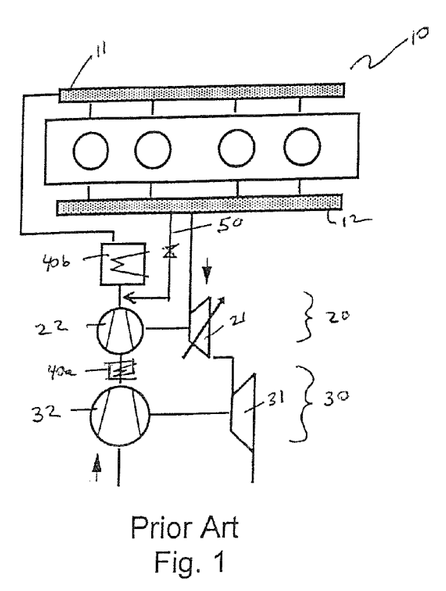
FIG. 1 prior art Variable Two Stage (V2S)

FIG. 1 shows a variable two stage (V2S) turbocharger as disclosed in the Pflueger patents discussed above, and represents the state of the art over which the present invention improves. The four-cylinder in-line diesel internal combustion engine 10 shown in FIG. 1 is turbocharged in two stages via a turbocharger unit. For this purpose, a high-pressure stage 20 is arranged ahead of a single-flow low-pressure stage 30. Via the compressors 22 and 32 driven by the high-pressure variable geometry turbine 21 and low-pressure turbine 31, fresh air is compressed, cooled down in the two turbocharging-air coolers 40a, 40b, mixed to a certain percentage (>=0) with exhaust from an exhaust return flow and fed to the fresh air side 11 of the engine 10. The rotor diameter of the low-pressure turbine 32 is larger than that of the high-pressure turbine 21, with the rotor diameter ratio d.sub.L, ND/d.sub.L, HD being 1.2 to 1.8 between low-pressure and high pressure turbine.

Figure 2:
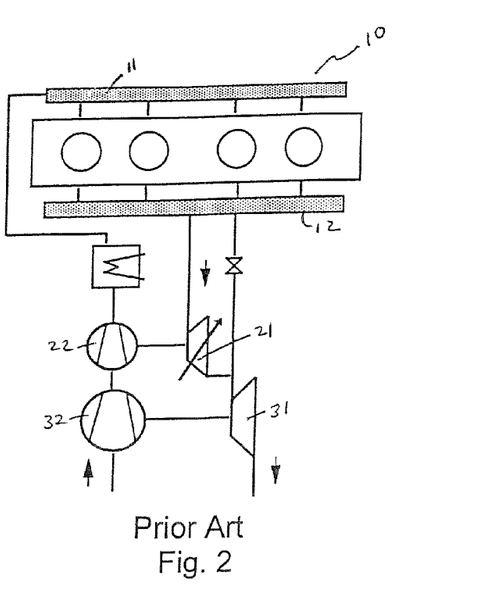
FIG. 2 prior art Variable Regulated Two Stage (VR2S)

FIG. 2 shows a variable regulate two stage (VR2S) turbocharger as disclosed in the Pflueger patents discussed above, and also represents the state of the art over which the present invention improves. The VR2S differs from the V2S system by the further provision of a bypass line 1 and pipe switch 2 for bypassing the HP VTG and a valve for controlling exhaust gas flow, thus combining the advantages of V2S and R2S. During cruising or slow speed operation, the high pressure turbine can substantially be bypassed. The high pressure turbine is however not choked off—it is allowed to spin freely and, since it remains coupled to the high pressure compressor, spins at the same rate as the high pressure compressor. Since the high pressure compressor is already part way up to operating speed, there is little "turbo lag" when there is a need for immediate boost.

Figure 3:
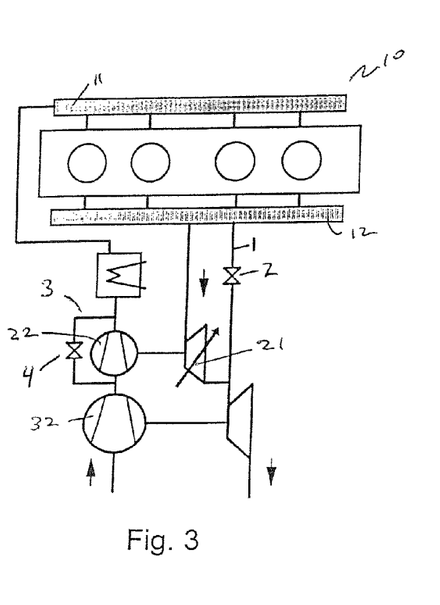
FIG. 3 variable regulated two stage turbocharger (VR2S) with a HP compressor bypass (VR2S-CB)

Turning now to the present invention, according to a first embodiment of the invention as shown in FIG. 3, the inventors discovered that significant benefits could be obtained by providing the variable regulated two stage turbocharger (VR2S) shown in FIG. 2 with a HP compressor bypass (hereafter VR2S-CB) comprising bypass pipe 3 and pipe switch 4. More complex than the VR2S, this design allows both the HP turbine and the HP compressor to be bypassed, such that the system could in effect, at high exhaust gas flow low power (e.g., maintaining high speed on a level highway), simply operate as an efficient single stage compressor, with large LP turbine and large LP compressor. The HP compressor, being bypassed, does not impede flow of air from the LP compressor to the engine. At the same time, since the HP stage is allowed to "idle", it allows the HP stage to quickly increase RPM, thus provide rapid transient response, when acceleration is required for passing or when power is required for climbing.

Figure 4:
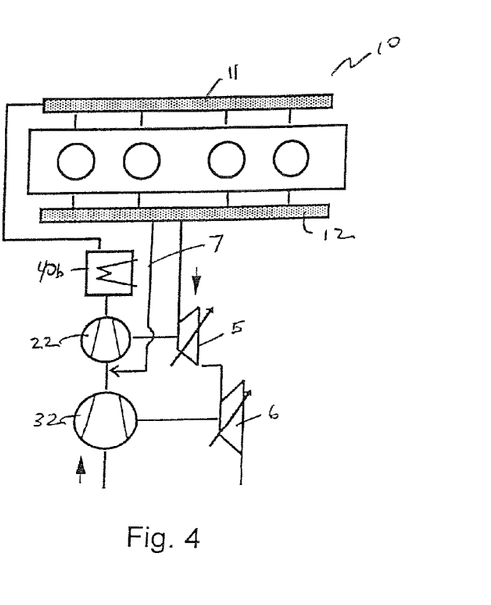
FIG. 4 variable regulated stage turbocharger VR2S with a LP VTG turbine ("dual variable two stage" or DV2S)

According to a second embodiment of the invention as shown in FIG. 4, the inventors discovered that significant benefits could be obtained by providing a variable regulated stage turbocharger VR2S with a LP VTG turbine 6 (hereafter "dual variable two stage" or DV2S) and with no bypass piping. While requiring no bypass piping or controllers/actuators, this system allows optimal energy extraction. All exhaust mass flows first through the HP turbine 5, then through the LP turbine 6. When compared to a HP turbine with bypass such as used in the first embodiment discussed above, the present HP turbine is comparatively large, and it is the presence of the VTG vanes that is relied upon for rapid startup and acceleration of the HP turbine, providing rapid response when transitioning from low flow volume to high flow volume. The variable vanes in the low pressure turbocharger 6 allow further energy extraction from the exhaust gas even at low exhaust gas mass flow. Further, by using the low pressure VTG as a restrictor, exhaust gas pressure may be increased sufficiently to allow exhaust pas recirculation (EGR) via line 7 at a point between LP compressor 32 and HP compressor 22. One consideration in this embodiment is that the HP and LP compressors are not variable or bypassed, and must be dimensioned to accept the maximum expected air flow. This pairing of larger compressor and smaller turbine represents a potential inefficiency.

Figure 5:
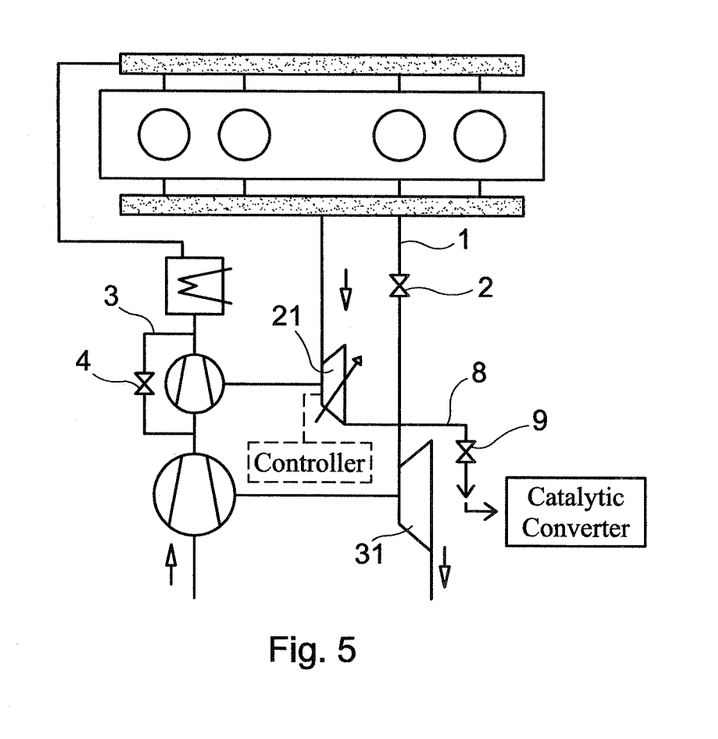
FIG. 5 VR2S with a HP compressor bypass and with a LP turbine bypass (VR2S-CB-LTB)

According to a third embodiment of the invention, the inventors discovered that significant benefits could be obtained by providing a VR2S with a HP compressor bypass pipe 3 and pipe switch 4 and with a LP turbine bypass 8 (VR2S-CB-LTB). This allows the system to operate as though it were a small single stage turbocharger when desired. For example, heat contained in the exhaust on startup is not used to warm the LP turbine, and instead is allowed to travel to a catalytic converter during startup of a cold diesel engine, reducing VOC, NOx and particulate emissions. Further, similar to the first embodiment discussed above, by driving the LP turbine and bypassing the HP compressor, this system can in effect bypass the HP stage and operate as a single large turbocharger.

Figure 6:
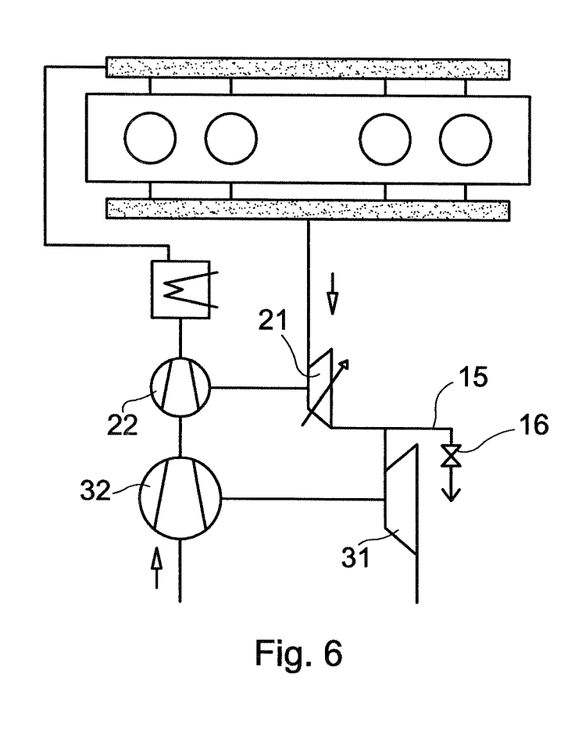
FIG. 6 V2S with a LP turbine bypass (V2S-LTB)

According to a fourth embodiment of the invention, the inventors discovered that significant benefits could be obtained by providing a V2S with a LP turbine bypass pipe 15 and pipe switch 16 (hereafter V2S-LTB).

Figure 7:
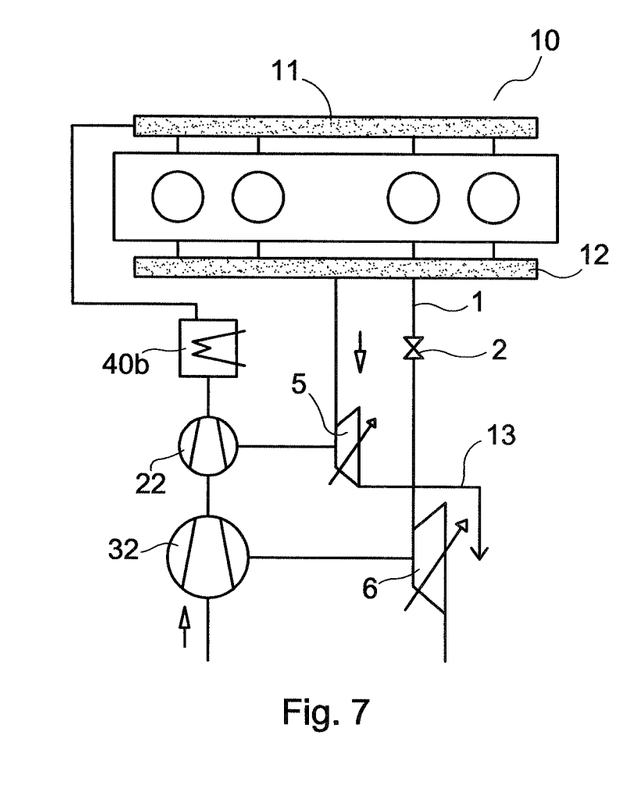
FIG. 7 DV2S with a HP turbine bypass (thus making the system "regulated") and with a LP turbine bypass (DVR2S-LTB)

According to a fifth embodiment of the invention, the inventors discovered that significant benefits could be obtained by providing a DV2S with a HP turbine bypass pipe 1 and switch 2 (thus making the system "regulated") and with a LP turbine bypass 13 (hereafter DVR2S-LTB).

Figure 8:
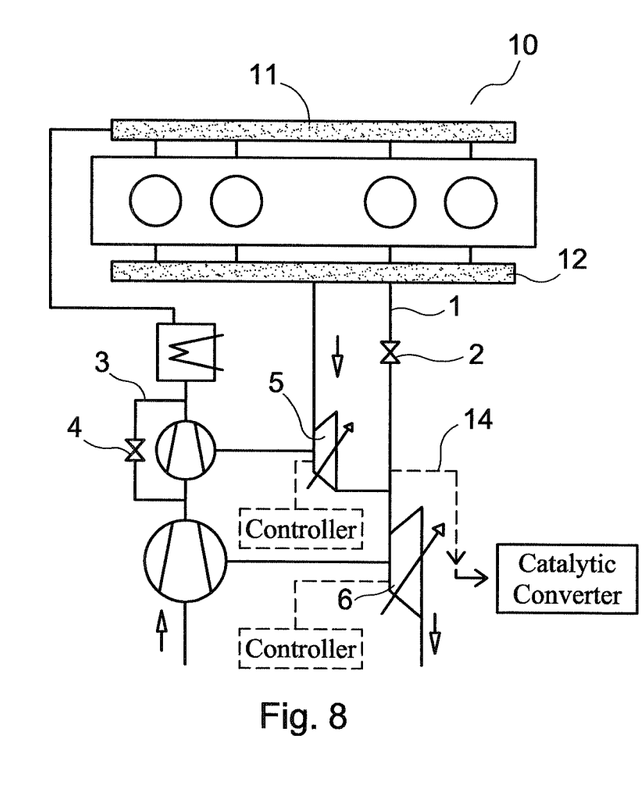
FIG. 8 DVR2S with a HP compressor bypass and with a LP turbine bypass (DVR2S-CB-LTB)

According to a sixth embodiment of the invention, the inventors discovered that significant benefits could be obtained by providing a DVR2S with a HP compressor bypass pipe 3 and switch 4 and with an optional LP turbine bypass 14 (hereafter DVR2S-CB-LTB). The VTG turbines can provide backpressure, and the HP stage and the LP stage can be individually selectively bypassed or engaged as desired depending upon engine operation.

Figure 9:
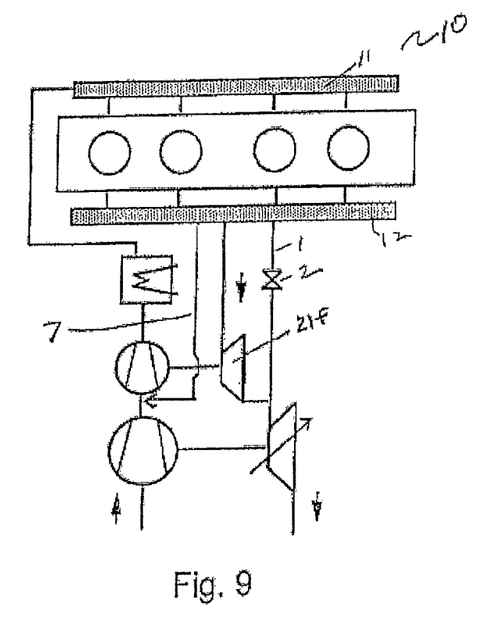
FIG. 9 R2S with a HP turbine bypass (thus making the system "regulated") and with a variable geometry LP turbine, with an EGR line optionally providing exhaust gas between the LP and HP compressors.

According to a seventh embodiment of the invention, the inventors discovered that significant benefits could be obtained by providing an R2S with a HP turbine 21$f$ bypass pipe 1 and pipe switch 2 (thus making the system "regulated") and with a fixed geometry HP turbine 22 and a variable geometry LP turbine, with an EGR line 7 optionally providing exhaust gas recirculation between the LP and HP compressors. The HP and LP VTGs can be independently driven to provide back pressure for optimal engine operation and for boosting exhaust gas pressure for EGR.

Figure 10:
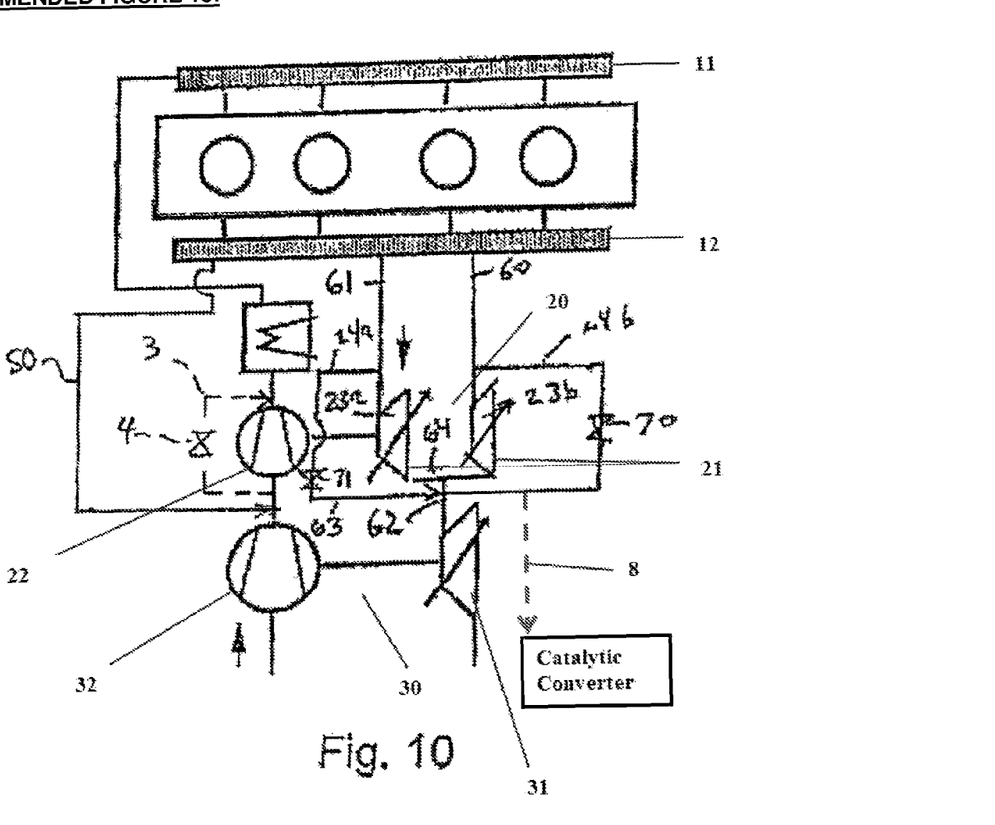
FIG. 10 a two stage turbocharger with a twin-volute HP turbine, wherein each of the volutes is provided with a bypass, and with a variable geometry low pressure turbine, the LP turbine optionally provided with a bypass (shown in dashed lines), the HP compressor and LP compressor optionally independently provided with a bypass (optional bypass of the HP compressor shown in dashed lines), and an EGR line 50 connected behind the HP compressor.

According to an eighth embodiment of the invention, the inventors discovered that significant benefits could be obtained by providing a two stage turbocharger with the HP turbine having a twin volute configuration 23*a*, 23*b*, wherein each of the volutes is provided with a bypass 24*a*, 24*b* with pipe switches 70, 71, and with a variable geometry low pressure turbine, the LP turbine optionally provided with bypass, and the HP compressor and LP compressor optionally independently provided with bypass. In the case that the engine has divided exhaust manifolds with one manifold going to each volute, each of the twin volutes may be provided with a turbine bypass. Alternatively, in the case that a single exhaust manifold leads from the engine to both volutes, one of the volutes may be provided with a valve or restrictor, such that exhaust flows to both volutes at high engine speed and load, but is diverted into only one passage of a divided turbine casing at low engine speeds. This essentially doubles the flow of exhaust gas through the single turbine casing passage and maintains the turbocharger speed at higher levels than otherwise could be reached at low engine speeds. This device is much simpler than the complicated variable nozzle vane systems and does not require a precise control system for positioning. However, the increase in boost at low engine speeds might be great enough to cause the turbocharger compressor to operate in its surge or unstable area. In this case, the LP VTG is operated to move the compressor efficiency islands and choke area to lower flow and can result in lowering the compressor efficiency when the engine is operating at high speed and load.

Linked to a motor electronic system, which records the operating characteristics of the engine, such as rotational speeds, mass flows, turbocharging pressures and turbocharging air temperatures, the various variable geometry turbines and compressors and the various pipe switches can be controlled for a mode of operation that minimizes consumption or pollutants at any operating point of the engine. As a rule, a trade-off is required between minimal consumption and minimal pollutants. Depending on the ambient conditions, load state and rotational speed, a target-optimized splitting of the exhaust mass flow is made to the fresh air side, the high-pressure turbine, and the low-pressure turbine.

In FIG. 10 the two flows 23*a*, *b* of the twin-flow high-pressure fixed geometry turbine are each connected on the inlet side via a separate pipe 60, 61 with the exhaust side 12 of the engine. On the outlet side, the flows 23*a*, 23*b* are connected via outlet-side pipes 64 to a common pipe 62, which in turn is connected on the inlet side to the single-flow low-pressure variable geometry turbine.

For optimum adaptation of the turbocharger unit to the operating conditions of the engine 10, a bypass channel 24*a* and 24*b* is provided in symmetrical arrangement for each flow 23*a*, 24*b* of the high-pressure turbine. Each of these branches off the separate pipe 60 or 61 designed as exhaust elbow, bypass the high-pressure turbine and flow into the common pipe 62 for the same supply to the single-flow low-pressure turbine. Each bypass channel 24*a*, 24*b* is provided with a pipe switch 70 or 71 arranged downstream of the branch. These can be integrated in the exhaust elbow or in the housing of the high-pressure turbine and can be designed as slide, valve or flap or similar element and controlled by a CPU both singly and jointly. By means of pipe switches 70 it is possible to increase exhaust back pressure in the exhaust manifold so that pressure in the exhaust manifold is greater than at the fresh air side downstream of the high pressure compressor and EGR can be realized via EGR pipe 50. By means of pipe switch 70 as described before, a splitting of the exhaust flow is possible to the high-pressure turbine 21, the low pressure turbine 31, and exhaust return pipe 50.

In addition, exhaust return pipes 50 are connected, leading to the fresh air side 11 respectively behind compressor 22. The returned quantity of exhaust can, however, also be fed to any other point of the fresh air side. By means of the pipe switch 70 on the one hand the bypass channel 24*a* can be closed and, on the other, with opened bypass channel 24*a* partial flows distributed in the required ratio to the low-pressure turbine 30 and exhaust return pipe 50 (exhaust gas return rate $>=0$). Furthermore, for control of the pipe switches 70, 71 and 50 as a function of the operating characteristic variables a1-$n$, the pipe switches 70, 71 and 50 are connected to an electronic motor control 80, which ensures an optimum distribution of the exhaust mass flow for operation. Through the possible adjustment of different bypass rates 24*a*, *b*, an additional degree of freedom is obtained for the distribution of the entire exhaust mass.

Fundamentally, any turbine can be designed to be single flow, double flow, or with variable turbine geometry, especially with a distributor with adjustable vanes. Further, any compressor may be fixed geometry or variable geometry.

A stationary embodiment of a preliminary stage of the invention is explained in an article entitled "Regulated Two-Stage Turbocharging—KKK's new charging system for commercial diesel engines" authored by the inventor. It is desired to have very high boost pressure at low engine speeds to improve the engine's accelerating behavior. The desire for an over proportionately high air mass flow, i.e. boost pressure, at low engine speeds dictates that the turbine and compressor must be relatively small. It is also desirable to have increased boost pressure at the upper engine speed range to have higher engine performance with low fuel consumption and emissions. Increased air mass flow for the rated power point basically requires a larger turbocharger to ensure high efficiency at greater air and exhaust gas mass flows.

Since the ideal solution would be a combination of both, the inventors developed a regulated 2-stage turbocharging system which can operate as a small (HP) turbocharger for low engine speed rapid acceleration, or as a combination of small and large (LP) turbocharger (mainly LP) at high engine speeds, with the LP turbocharger boosting the combustion air charge pressure prior to going to the HP turbocharger, for rapid acceleration (responsiveness) at high (passing, overtaking) speeds.

The turbochargers are positioned in series with bypass control. The exhaust gas mass flow coming from the engine cylinders first flows into the exhaust gas manifold. From here, either the entire exhaust gas mass flow is expanded through the high-pressure turbine (HP) or a part of the mass flow is conducted through the bypass. Regardless of the proportion of gas flowing through the HP turbine, the entire exhaust gas mass flow (coming from the HP turbine or the bypass) then passes through the low-pressure (LP) turbine arranged downstream.

The intake air mass flow is thus first precompressed through the low-pressure stage and, ideally, intercooled. Further compression and charge air-cooling takes place in the high-pressure stage. As a result of the precompression, the relatively small HP compressor operates at a higher-pressure level, so that the required air mass flow throughput can be obtained. At low engine speeds, i.e. low exhaust gas mass flows, the bypass remains closed and the entire exhaust gas expands through the HP turbine (prior to reaching the LP turbine). This results in a very quick and high boost pressure rise. With increased engine speed or load, the bypass valve is opened, progressively shifting more of the expansion work to the LP turbine (which can handle higher air mass flow).

Therefore, the regulated 2-stage charging system allows a stepless, responsive, variable matching of the turbine and compressor side to the engine's operational requirements. The rated engine speed can be reduced without reduction in performance.

It is understood that engine load does not necessarily correspond with engine speed. For example, when climbing a hill, an engine load may increase while the engine speed remains constant or even decreases. In such a case, in the present invention as load increases the bypass valve begins to close, shifting more expansion work to the HP turbine.

When coasting down a hill, the load on an engine will be comparatively low (or even negative), and the engine speed may increase. In such a case, when an additional motor brake is required (commercial diesel engines, trucks), the bypass valve may remain closed, such that all exhaust gas passes first through the HP turbine, then the LP turbine. If no motor brake is required, expansion work can be shifted to the LP turbine in order to reduce engine friction and fuel consumption of the engine.

When maintaining speed on a level road, either low speed or high speed, the load on an engine may be small. In such a case, the bypass valve may be opened, such that the HP turbine is idling rather than working.

When accelerating for overtaking on a level road, at low speed and high load (accelerator pedal depressed) exhaust flow mass increases. Expansion work initially takes place mainly in the (rapidly accelerating) HP turbo, which causes the HP compressor to rapidly boost fresh air intake pressure. Then, as engine speed and load increases, the bypass valve gradually opens, progressively shifting more of the expansion work to the LP turbine (which can handle higher air mass flow), until expansion work is balanced between the HP and LP turbine. With the HP and LP turbines operating together, compression is boosted in the LP compressor and this precompressed air is further compressed in the HP compressor.

The present invention is not limited to land based turbocharged engines. In the past decade, the increasing cost and diminishing availability of aviation gas, and the desire to provide a more reliable and economical aviation piston engine has resulted in a rediscovery of aviation diesel engines (see Ells, "Future Flight—Horsepower of a Different Color—High-Compression Diesels and Efficient Turbines Will Power Tomorrow's Aircraft"—AOPA Pilot August 2000, pages 163-170). Turbocharged aviation diesel engines are under development by Teledyne Continental Motors, Lycoming, Moraine Renault, DeltaHawk and Zoche.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Now that the invention has been described, we claim:

1. An internal combustion engine (10), comprising:
    a plurality of combustion cylinders;
    at least one exhaust manifold (12) coupled with said combustion cylinders;
    at least one intake manifold (11) coupled with said combustion cylinders;
    a first turbocharger including a first turbine (21) having an inlet and an outlet, said first turbine inlet being fluidly coupled with said exhaust manifold (12) and having variable turbine geometry, and a first compressor (22) having an inlet and an outlet, wherein the first turbine (21) is free of a bypass piping for bypassing at least a portion of exhaust gas around the first turbine (21);
    a second turbocharger including a second turbine having an inlet and an outlet, said second turbine inlet having variable turbine geometry and being fluidly coupled with said first turbine outlet, and a second compressor (32) having an inlet and an outlet, said second compressor outlet fluidly coupled with said first compressor inlet, said first compressor outlet fluidly coupled with said intake manifold; and
    an EGR line (7) for feeding exhaust gas from the exhaust manifold to a line fluidly connecting the second compressor (32) to the first compressor (22).

2. An internal combustion engine (10), comprising:
    a plurality of combustion cylinders;
    at least one exhaust manifold (12) coupled with said combustion cylinders; at least one intake manifold (11) coupled with said combustion cylinders;
    a first turbocharger (20) including a first turbine (21) having an inlet and an outlet, and a first compressor (22) having an inlet and an outlet, said first turbine inlet having variable turbine geometry and being fluidly coupled with said exhaust manifold;
    a second turbocharger (30) including a second turbine (31) having an inlet and an outlet, said second turbine inlet having variable turbine geometry and being coupled with said first turbine outlet, and a second compressor (32) having an inlet and an outlet, said second compressor outlet fluidly coupled with said first compressor inlet, said first compressor outlet fluidly coupled with said intake manifold,
    a bypassing piping (3) provided for bypassing at least a portion of flow around the first compressor (22),
    a bypass piping (24a, 24b) provided for bypassing at least a portion of exhaust gas around the first turbine (21), and
    an EGR line (50) for feeding exhaust gas from the exhaust manifold to a line fluidly connecting the second compressor (32) to the first compressor (22).

3. The internal combustion engine as in claim 2, wherein said bypass piping (24*a*, 24*b* to 8) bypasses at least a portion of exhaust gas around the first turbine (21) and the second turbine (31) to a catalytic converter.

4. The internal combustion engine as in claim 2, further including a control means (4) whereby the first compressor is bypassed during high engine speed.

5. The internal combustion engine as in claim 2, wherein the first turbine is a twin volute turbine (23*a*, 23*b*) having flow controlled independently through each of the volutes (23*a*, 23*b*).

* * * * *